United States Patent [19]

Sinclair

[11] Patent Number: 5,172,271
[45] Date of Patent: Dec. 15, 1992

[54] GRADED INDEX LENS STRUCTURE SUITABLE FOR OPTICAL FIBER TERMINATION

[75] Inventor: William J. Sinclair, Manotick, Canada

[73] Assignee: JDS Fitel Inc., Nepean, Canada

[21] Appl. No.: 798,639

[22] Filed: Nov. 26, 1991

[51] Int. Cl.⁵ .......................... G02B 6/32; G02B 1/00
[52] U.S. Cl. ....................................... 359/652; 385/34
[58] Field of Search .............................. 385/34, 32, 33; 359/652-654

[56] References Cited

U.S. PATENT DOCUMENTS

| | | | |
|---|---|---|---|
| 4,268,112 | 5/1981 | Peterson | 385/61 |
| 4,490,020 | 12/1984 | Sakaguchi et al. | 385/49 |
| 4,521,071 | 6/1985 | Böhm | 385/34 |
| 4,962,988 | 10/1990 | Swann | 385/34 |
| 5,016,963 | 5/1991 | Pan | 385/33 |

Primary Examiner—Bruce Y. Arnold
Assistant Examiner—James Phan
Attorney, Agent, or Firm—Eliot S. Gerber

[57] ABSTRACT

A graded index lens having one end-surface thereof adapted for connection to an optical fiber or the like characterized by an axially asymmetrically tapered end portion terminating in the end-surface.

8 Claims, 2 Drawing Sheets

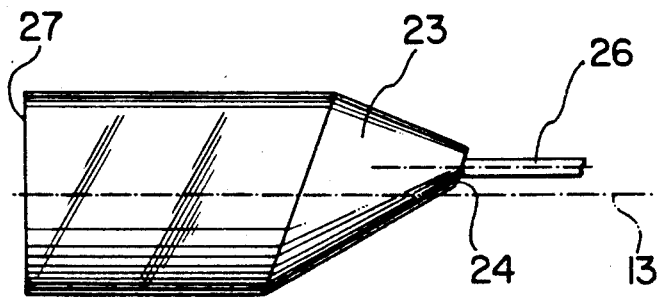
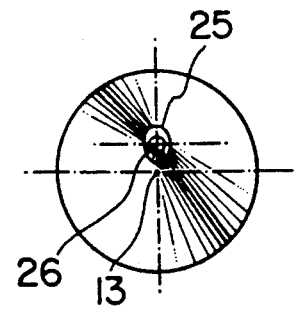
FIG. 3a  FIG. 3b
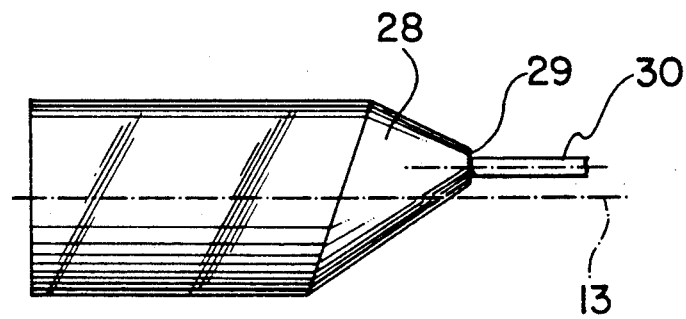
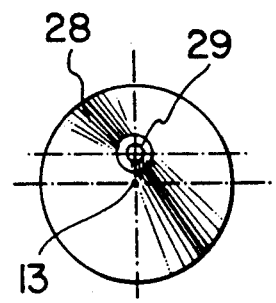
FIG. 4a  FIG. 4b
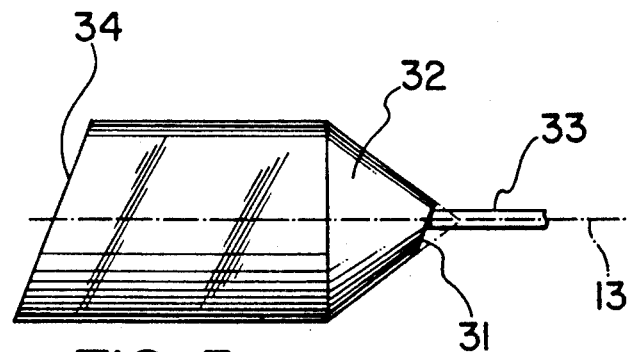
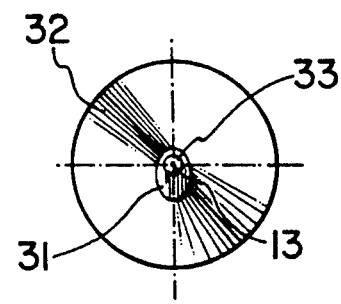
FIG. 5a  FIG. 5b

GRADED INDEX LENS STRUCTURE SUITABLE FOR OPTICAL FIBER TERMINATION

BACKGROUND OF THE INVENTION

1. Field of the Invention

The present invention relates generally to optical lens, and particularly to so-called "Selfoc" (TM) lens also known as graded index (GRIN) lens. More particularly still, it relates to such class of lens which are configured at one end thereof for termination and/or connection of optical fibers to provide reduced back-reflection to the fiber.

2. Prior Art of the Invention

U.S. Pat. No. 4,268,112 granted May 19, 1981 to Peterson discloses several embodiments based on the optical transmission characteristics of a Luneberg lens for terminating optical fibers, where the fiber is inserted into an axial bore at the tapered end of an elliptical bead having a graded index of refraction where the fiber end lies at a focal point of the bead. The entire structure is axially symmetrical.

U.S. Pat. No. 4,490,020 granted Dec. 25, 1984 to Sakaguchi et al discloses a cylindrical lens the width of the end portion of which continuously decreases towards its tip at least in a plane parallel to the optical axis of the output light from a semiconductor laser. The structure, again, is axially symmetrical.

U.S. Pat. No. 4,962,988 granted Oct. 16, 1990 to Swann discloses several graded index glass rod lens having ends for joining to optical fibers, which ends are tapered down radially, the taper being axially symmetrical. The profile of the tapered portion of the lens may be frusto-conical, convex or concave, and the optical fiber end being terminated by the lens is co-axial with the lens axis.

The above U.S. patents are incorporated herein by reference.

SUMMARY OF THE INVENTION

The present invention provides a lens having improved, that is reduced, back-reflection characteristics.

In order to achieve a reduction in the back-reflection from one end of the lens to the other end along the length thereof, the other end is tapered down asymmetrically with respect to the central axis of the lens. A further variation on axial asymmetry of the taper, is that the end surface may lie in a plane perpendicular to the lens axis but may be oval or elliptical in shape; i.e. generally exhibit no rotational symmetry at its circumference. Oval or elliptical end surfaces are necessary, for example, where two fibers are to be terminated by one lens. A further variation is that the terminating surface of the taper lie in a plane that is not perpendicular to the lens axis, but is inclined with respect thereto by an angle smaller than 90 degrees. All of these measures contribute to the reduction of undesirable back-reflection in the lens.

Thus, according to the present invention there is provided a graded index lens having one end surface thereof adapted for connection to an optical fiber characterized by an axially asymmetrically tapered end portion terminating in said end-surface.

In another aspect, the axially asymmetrically tapered end portion is characterized by axial asymmetry of only a final portion of the axial taper.

In a narrower aspect, the other end of the graded index lens has a back-surface inclined by an angle smaller than 90 degrees with respect to the lens axis.

The end-surface of the tapered end may be perpendicular, or inclined by less than 90 degrees, with respect to the lens axis.

The end-surface of the tapered end may also have either circular, oval, or elliptical circumference. In fact, it may exhibit an undefined circumference.

BRIEF DESCRIPTION OF THE DRAWINGS

The preferred embodiments of the present invention will now be described with reference to the annexed drawings, wherein:

FIGS. 3a and 3b illustrates an asymmetrically tapered graded index lens ending in a slanted end-surface connected to one optical fiber;

FIGS. 4a and 4b illustrates an asymmetrically tapered graded lens ending in a perpendicular end-surface connected to one optical fiber; and FIGS. 5a and 5a illustrates a partially asymmetrically tapered graded index lens ending in a slanted end-surface and having a slanted back-surface connected to one optical fiber.

DETAILED DESCRIPTION OF THE PREFERRED EMBODIMENT

Figure 1A:
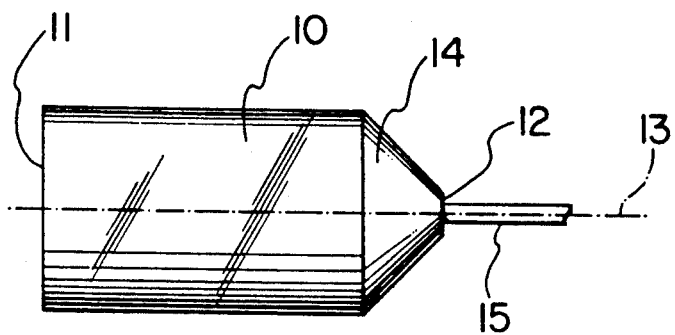
FIGS. 1a and 1b are illustrations of prior art graded index lens connected to an optical fiber.
Figure 1B:
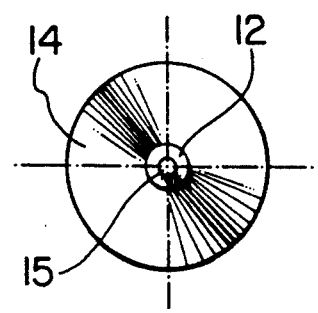

Referring to FIGS. 1a and 1b of the drawings, according to the prior art, a graded index (GRIN) lens 10 has a perpendicular back-surface 11 and an end-surface 12, also perpendicular to the lens axis 13. The end-surface 12 is the terminating surface of an axially symmetrically tapered cone 14 and connects to an optical fiber 15. While for many applications this arrangement is perfectly suited, for some applications the back-surface 11 reflects too much light back to the fiber 15.

Figure 2A:
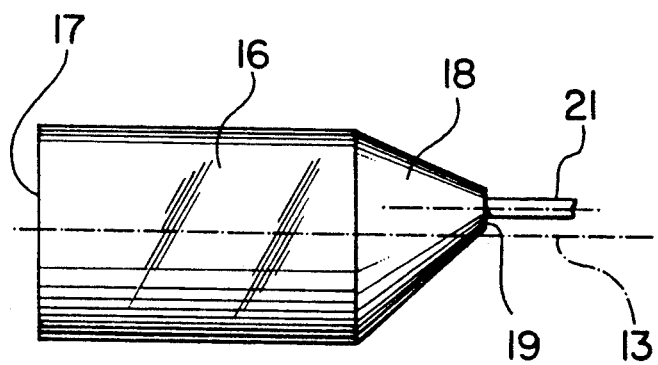
FIGS. 2a and 2b illustrate an asymmetrically tapered graded index lens connected to two optical fibers according to the present invention.
Figure 2B:
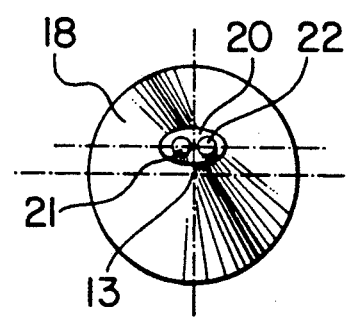

FIGS. 2a and 2b of the drawings show a GRIN lens 16 having a perpendicular back-surface 17 and an axially asymmetrically tapered cone 18 terminating in a perpendicular end-surface 19 which has, due to tapering asymmetry, an oval circumference 20. Two optical fibers 21 and 22 are connected to the end-surface 19. Because the fibers 21 and 22 are connected to the end-surface 19, which is off-axis, the back-reflection from the back-surface 17 is considerably lessened compared to an on-axis connection.

In FIGS. 3a and 3b not only is the axial taper 23 strongly asymmetrical but it also terminates in a slanted (i.e. not axially perpendicular) end-surface 24. In this case the circumference is an oval 25, sufficient in area to accommodate one optical fiber 26. Again back-reflection from back-surface 27 is diminished. Also diminished is back-reflection from the surface 24.

In FIGS. 4a and 4b an asymmetrical axial taper 28 terminates in perpendicular end-surface 29 which is substantially circular in circumference, but an optical fiber 30 is still connected off-axis.

In FIGS. 5a and 5b, only the end-surface 31 of an otherwise axially symmetrical taper 32 is axially asymmetrical. However, due to the fact that an optical fiber 33 is on-axis, the back-surface 34 must be at an angle less than 90 degrees with respect to the axis 13 in order to diminish back-reflection.

Accordingly, in order to mitigate back-reflection from the back-surface of a GRIN it is necessary not only to have, at least in part, an asymmetrical taper of the fiber-terminating end, but should the fiber be connected "an-axis" to have the back-surface slanted by less than 90 degrees with respect to the axis.

The embodiment of FIGS. 5a and 5b is generally not desirable and is rendered here only for completeness of describing the present invention.

What is claimed is:

1. A graded index lens having one end-surface thereof adapted for connection to an optical fiber characterized by an axially asymmetrically tapered end portion terminating in said end-surface.

2. The graded index lens as defined in claim 1, wherein said end-surface inclined by an angle smaller than 90 degrees with respect to a lens axis.

3. The graded index lens as defined in claim 1, wherein said end-surface being perpendicular to the lens axis.

4. The graded index lens as defined in claim 1, wherein said end-surface being a circumference which is circular, oval or elliptical.

5. The graded index lens as defined in claim 2, wherein said end-surface being a circumference which is circular, oval or elliptical.

6. The graded index lens as defined in claim 3, wherein said end-surface being a circumference with is circular, oval or elliptical.

7. The graded index lens as defined in claim 1, wherein said axially asymmetrically tapered end portion being an end-surface inclined with respect to a lens axis by an angle substantially smaller than 90 degrees.

8. The graded index lens as defined in claim 7, wherein the other end terminates in a surface inclined with respect to the lens axis by an angle smaller than 90 degrees.

* * * * *